(12) United States Patent
Mann et al.

(10) Patent No.: US 6,655,850 B2
(45) Date of Patent: Dec. 2, 2003

(54) HYBRID FIBER EXPANDED BEAM CONNECTOR AND METHODS FOR USING AND MAKING THE HYBRID FIBER EXPANDED BEAM CONNECTOR

(75) Inventors: Larry G. Mann, Painted Post, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/147,642

(22) Filed: May 16, 2002

(65) Prior Publication Data

US 2003/0021543 A1 Jan. 30, 2003

Related U.S. Application Data

(60) Provisional application No. 60/303,611, filed on Jul. 5, 2001.

(51) Int. Cl.[7] .................................................. G02B 6/38
(52) U.S. Cl. ........................................... 385/74; 385/33
(58) Field of Search .............................. 385/70, 33, 58, 385/60, 61, 72, 74

(56) References Cited

U.S. PATENT DOCUMENTS

| | | | |
|---|---|---|---|
| 4,119,362 A | | 10/1978 | Holzman |
| 4,497,536 A | * | 2/1985 | Payne et al. ................... 385/61 |
| 4,737,006 A | | 4/1988 | Warbrick ................. 350/96.18 |
| 4,781,431 A | | 11/1988 | Wesson et al. ........... 350/96.21 |
| 4,844,580 A | | 7/1989 | Lynch et al. |
| 4,854,663 A | * | 8/1989 | Borsuk et al. ................. 385/33 |
| 4,925,267 A | | 5/1990 | Plummer et al. |
| 4,969,702 A | * | 11/1990 | Anderson ................... 350/96.2 |
| 5,185,836 A | * | 2/1993 | Baker ........................... 385/33 |
| 5,293,438 A | * | 3/1994 | Konno et al. .................. 385/61 |
| 5,661,832 A | | 8/1997 | Yonemura |
| 5,699,464 A | * | 12/1997 | Marcuse et al. ............... 385/33 |
| 5,926,593 A | | 7/1999 | Asami et al. |
| 5,967,653 A | * | 10/1999 | Miller et al. ................... 385/43 |
| 6,282,347 B1 | * | 8/2001 | Ono et al. ...................... 385/33 |
| 6,312,163 B1 | * | 11/2001 | Ono et al. ...................... 385/70 |
| 6,438,290 B1 | * | 8/2002 | Bietry et al. ................... 385/33 |
| 2002/0009261 A1 | | 1/2002 | Bhagavatula et al. .......... 385/35 |

OTHER PUBLICATIONS

Mary Adcox, Splicing and Fiber Assembly Compatibility for Non–Zero Dispersion–Shifted Fiber and Standard Single–Mode Fiber, Presented at NOC/EC 2000, pp. 1–7.

* cited by examiner

*Primary Examiner*—Khiem Nguyen
(74) *Attorney, Agent, or Firm*—William J. Tucker; Timothy M. Schaeberle (57) ABSTRACT

A hybrid fiber expanded beam connector and methods for making and using the hybrid fiber expanded beam connector are described herein. Basically, the hybrid fiber expanded beam connector can be used to connect dissimilar fibers such as single mode fibers that have different mode field diameters (MFDs) or different effective areas. In particular, the hybrid fiber expanded beam connector includes a first lensed optical fiber that is optically coupled to a second lensed optical fiber but physically separated from the second lensed optical fiber. The first lensed optical fiber including one type of fiber is capable of expanding a light beam traveling therein and outputting a collimated light beam. The second lensed optical fiber including another type of fiber is capable of receiving the collimated light beam and focusing the received light beam such that the light beam travels from the first lensed optical fiber to the second lensed optical fiber. In a similar manner, the hybrid fiber expanded beam connector can transmit a light beam from the second lensed optical fiber to the first lensed optical fiber.

27 Claims, 5 Drawing Sheets

HYBRID FIBER EXPANDED BEAM CONNECTOR AND METHODS FOR USING AND MAKING THE HYBRID FIBER EXPANDED BEAM CONNECTOR

CLAIMING BENEFIT OF PRIOR FILED PROVISIONAL APPLICATION

This application claims the benefit of U.S. Provisional Application Serial No. 60/303,611, filed on Jul. 5, 2001 and entitled "Expanded Beam Hybrid Fiber Connector" which is incorporated by reference herein.

BACKGROUND OF THE INVENTION

1. Field of the Invention

The present invention relates in general to optical connectors and, in particular, to a hybrid fiber expanded beam connector that can be used to connect dissimilar fibers such as single mode fibers that have different mode field diameters (MFDs) or different effective areas. The present invention can also be used to connect fibers that are difficult to fusion splice because they are made of glasses with different coefficient of thermal expansions (CTE).

2. Description of Related Art

Manufacturers of optical connectors have been trying to design an optical connector that can be used to connect different types of fibers. This type of optical connector would be desirable because there is an increasing number of different fiber types becoming commercially available including, for example, specialty fibers and dispersion compensating fibers. The specialty fibers and dispersion compensating fibers all have different MFDs and thus different effective areas. Unfortunately, today there are no optical connectors that can connect different types of fibers. Instead, today one has to fusion splice different fiber types to each other which is time consuming and sometimes not very effective (high losses). Accordingly, there is a need for an optical connector that can effectively connect and mode match different types of fibers. This need and other needs are addressed by the hybrid fiber expanded beam connector and methods of the present invention.

BRIEF DESCRIPTION OF THE INVENTION

The present invention includes a hybrid fiber expanded beam connector that can be used to connect dissimilar fibers such as single mode fibers that have different mode field diameters (MFDs) or different effective areas. It can also be used to connect fibers that are made of glasses that have different composition, and thus different CTE. Optical fibers of different composition and CTE are difficult to bond together reliably by fusion splicing because of high stress at the splice. The hybrid fiber expanded beam connector includes a first lensed optical fiber that is optically coupled to a second lensed optical fiber but physically separated from the second lensed optical fiber. The first lensed optical fiber including one type of fiber is capable of expanding a light beam traveling therein and outputting a collimated light beam. The second lensed optical fiber including another type of fiber is capable of receiving the collimated light beam and focusing the received light beam such that the light beam travels from the first lensed optical fiber to the second lensed optical fiber. In a similar manner, the hybrid fiber expanded beam connector can transmit a light beam from the second lensed optical fiber to the first lensed optical fiber. The present invention also includes methods for making and using the hybrid fiber expanded beam connector.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1–8, there is disclosed a preferred embodiment of a hybrid fiber expanded beam connector 100 and preferred methods 700 and 800 for making and using the hybrid fiber expanded beam connector 100. Although the hybrid fiber expanded beam connector 100 is described as optically connecting only one pair of dissimilar fibers, it should be understood that the hybrid fiber expanded beam connector 100 can be used to connect one or more pairs of dissimilar fibers. Accordingly, the hybrid fiber expanded beam connector 100 and the preferred methods 700 and 800 should not be construed in such a limited manner.

Figure 3:
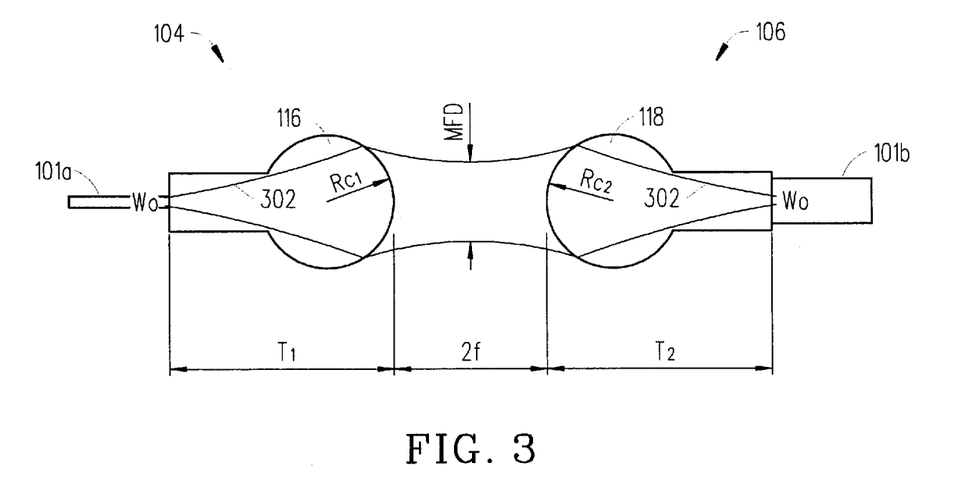
FIG. 3 is a block diagram illustrating various geometrical dimensions of two lensed optical fibers.

Basically, the hybrid fiber expanded beam connector 100 can be used to connect dissimilar fibers 101a and 101b such as single mode fibers that have different mode field diameters (MFDs) or different effective areas. In particular, the hybrid fiber expanded beam connector 100 includes a first lensed optical fiber 104 that is optically coupled to a second lensed optical fiber 106 but physically separated from the second lensed optical fiber 106. The first lensed optical fiber 104 including one type of fiber 101a is capable of expanding a light beam 302 traveling therein and outputting a collimated light beam 302 (FIG. 3 shows the light beam 302— which is collimated when between lensed fibers 104 and 106). The second lensed optical fiber 106 including another type of fiber 101b is capable of receiving the outputted light beam 302 and focusing the received light beam 302 such that the light beam 302 effectively travels from the first lensed optical fiber 104 to the second lensed optical fiber 106. In a similar manner, the hybrid fiber expanded beam connector 100 can transmit a light beam 302 from the second lensed optical fiber 106 to the first lensed optical fiber 104.

Figure 1:
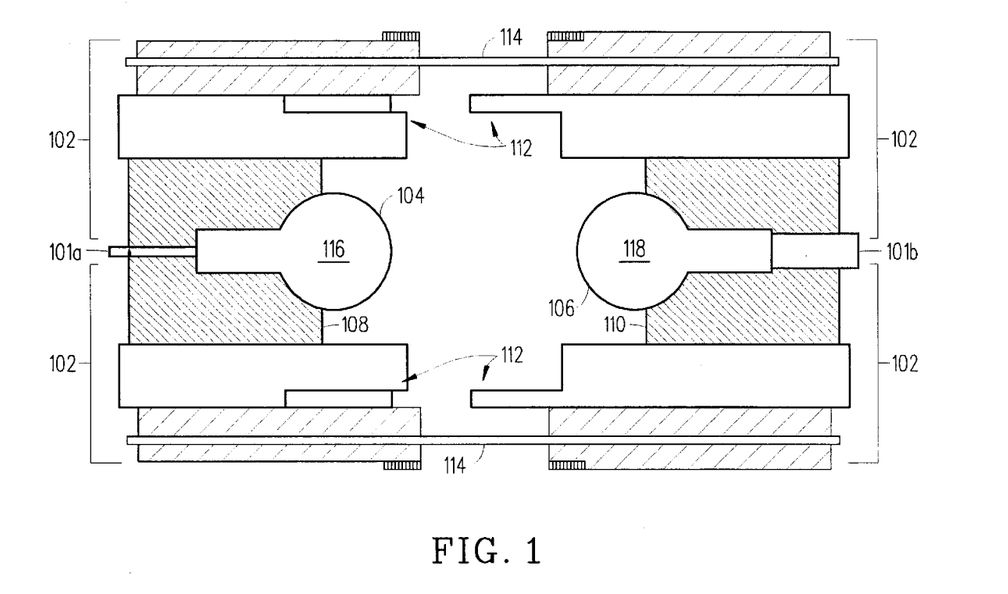
FIG. 1 is a block diagram showing an exploded view of a hybrid fiber expanded beam connector in accordance with the present invention.

Referring to FIG. 1, there is a block diagram showing an exploded view of the hybrid fiber expanded beam connector 100 that can be used to optically connect one or more pairs of dissimilar fibers 101a and 101b. Two fibers 101a and 101b are dissimilar fibers when they have different MFDs or different effective areas, or one the fibers 101a and 101b are made from two glasses of different composition. For example, the dissimilar fibers 101a and 101b can both be single mode fibers that have different MFDs such as a single mode fiber marketed by Corning Inc. as SMF-28™, non-zero dispersion-shifted fiber (NZ-DSF)(e.g., Corning® MetroCor™), non-zero dispersion-shifted fiber with large effective area (e.g., Corning® LEAF™). The hybrid fiber expanded beam connector 100 is a marked improvement over the state of the art since in the past one would have to splice the dissimilar fibers 101a and 101b. In other words, no connectors were available in the past to connect dissimilar fibers 101a and 101b before the hybrid fiber expanded beam connector 100.

The hybrid fiber expanded beam connector 100 incorporating the lensed optical fibers 104 and 106 enables the connection of dissimilar fibers 101a and 101b. In addition, the hybrid fiber expanded beam connector 100 also enables the connection of one fiber with a more complex profile to another fiber with a lower loss. For example, the hybrid fiber expanded beam connector 100 could be used to connect single mode fibers such as SMF-28™101a and NZ-DSF with large effective area 101b, or to connect SMF-28™101a and NZ-DSF 101b, instead of pigtails with splices. Based on measured coupling efficiencies for SMF-28™ 101a to SMF-28™ 101a with lensed optical fibers 104 and 106, the estimated loss at the hybrid fiber expanded beam connector 100 is 0.14 dB (σ=0.06), and it should be the same for connecting different types of fibers 101a and 101b. The estimated loss of 0.14 dB is lower than the current specification on losses for physical contact connectors: <0.25 dB for SMF-28™, <0.29 dB for NZ-DSF with large effective area, and <0.34 dB for NZ-DSF. For more details about splicing fibers, reference is made to a paper by Mary Adcox entitled "Splicing and Fiber Assembly Compatibility for Non-Zero Dispersion-Shifted Fiber and Standard Single-Mode Fiber" presented at NOC/EC 2000. This paper is incorporated by reference herein.

As illustrated in FIG. 1, the hybrid fiber expanded beam connector 100 includes a package 102 that supports the first lensed optical fiber 104 and the second lensed optical fiber 106. In particular, the package 102 supports and aligns the first lensed optical fiber 104 and the second lensed optical fiber 106 such that they face each other and are separated by a predetermined distance from each other to minimize insertion loss.

The package 102 includes a first ferrule 108, a second ferrule 110 and a mating alignment fixture 112. The first ferrule 108 supports and protects the first lensed optical fiber 104. Likewise, the second ferrule 110 supports and protects the second lensed optical fiber 106. The mating alignment fixture 112 along with one or more alignment pins 114 (two shown) are capable of aligning and holding the first ferrule 108 and the second ferrule 110 in place such that the first lensed optical fiber 104 is separated a predetermined distance from the second lensed optical fiber 106. The alignment pins 114 can also help to align the two lensed optical fibers 104 and 106.

Figure 2:
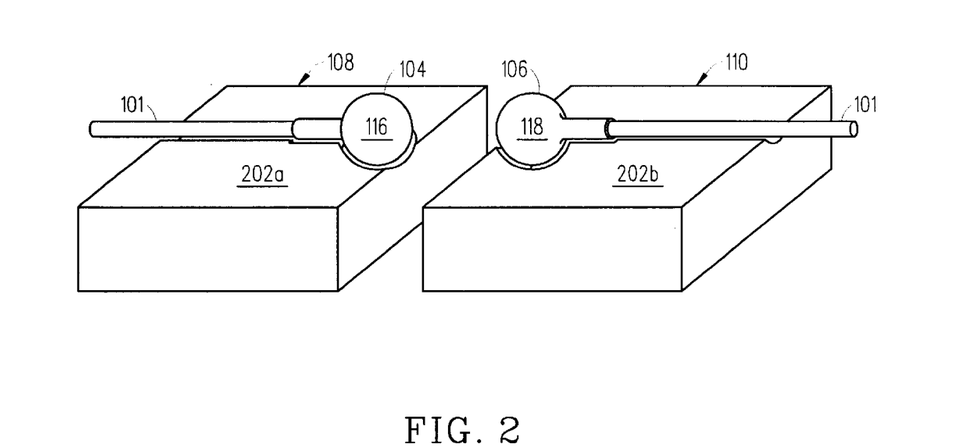
FIG. 2 is a perspective view of the bottom portions of two exemplary ferrules used to support the lensed optical fibers of the hybrid fiber expanded beam connector shown in FIG. 1.

The first ferrule 108 and the second ferrule 110 can be made from many different materials and can take many different forms. One such form is shown in FIG. 1, where convex lens 116 and 118 of the first lensed optical fiber 104 and the second lensed optical fiber 106 extend from the first ferrule 108 and the second ferrule 110, respectively. Another such form is shown in FIG. 2, where the convex lens 116 and 118 of the first lensed optical fiber 104 and the second lensed optical fiber 106 do not extend from the first ferrule 108 and the second ferrule 110, respectively. Instead, the first ferrule 108 and the second ferrule 110 are each made of a top piece (not shown) and a bottom piece 202a and 202b that are epoxied together around the first lensed optical fiber 104 and the second lensed optical fiber 106. In the second example, the first ferrule 108 and the second ferrule 110 can be butted against one another and still maintain the predetermined distance between the first lensed optical fiber 104 and the second lensed optical fiber 106.

In operation, the hybrid fiber expanded beam connector 100 includes the first lensed optical fiber 104 which is capable of expanding a light beam 302 traveling therein and outputting a collimated light beam 302 (FIG. 3 shows light beam 302—which is collimated when between lensed fibers 104 and 106). The second lensed optical fiber 106 is capable of receiving the collimated light beam 302 and focusing the received light beam 302 such that the light beam 302 effectively travels from the first lensed optical fiber 104 to the second lensed optical fiber 106. In a similar manner, the hybrid fiber expanded beam connector 100 can also transmit a light beam 302 from the second lensed optical fiber 106 to the first lensed optical fiber 104. Details about the first lensed optical fiber 104 and the second lensed optical fiber 106 are provided below with respect to FIGS. 3–6.

Referring to FIG. 3, there is a block diagram illustrating various geometrical dimensions of two lensed optical fibers 104 and 106. The geometrical dimensions of the lensed optical fibers 104 and 106 dictate the distance the first lensed optical fiber 104 is to be separated from the second lensed optical fiber 106. It should be understood that each lens 116 and 118 is a perfect collimator when:

$$T=R_c*(n/n-1)+\Phi$$

where

T=thickness of lens 116 and 118;

$R_c$=radius curvature of lens 116 and 118;

n=index of refraction of lens 116 and 118.

Φ=phase shift

For example at 1550 nm and using silica (n=1.444), the lens 116 and 118 are a perfect collimators when $T/R_c$=3.25. In practice, the thickness of the lens 116 and 118 needs to be increased by the diffractive focal shift because the lensed optical fibers 104 and 106 are not a point source and the spherical lens portion 116 and 118 are very small so the diffraction effects are large. It should be understood that the geometries of lens 116 and lens 118 can be the same or different depending on the different types of fibers 101a and 101b. Thus, in practice the $T/R_c$ ratio is greater than 3.25.

Examples of different designs of hybrid fiber expanded beam connectors 100 connecting single mode fibers such as Corning's SMF-28™ 101a and NZ-DSF with large effective area 101b, and connecting Corning's SMF-28™ 101a and NZ-DSF 101b are shown in Table 1. For the calculations in Table 1 it was assumed that the amount of thermal core broadening when splicing with borosilicate lensed optical fibers 104 and 106 is the same for all three types of fibers (i.e. 30.8% broadening). All the units in Table 1 are in microns.

TABLE 1

|  | Fiber MFD | MFD at splice between fiber and lens | Rc | T | MFD at beam waist | Distance between lenses when connecting to SMF-28 ™ |
|---|---|---|---|---|---|---|
| SMF-28 ™ | 10.4 | 13.6 | 224 | 817 | 61.3 | 3600 |
| NZ-DSF with large effective area | 9.6 | 12.6 | 226 | 832 | 61.3 | 3800 |
| NZ-DSF | 8.4 | 11.0 | 225 | 829 | 61.3 | 4300 |

* Reference is made FIG. 3 to see the geographical dimensions of MFD, $R_c$, and T.

As measured by the inventors, the coupling efficiency of two lensed optical fibers 104 and 106 having single mode fibers 101a and 101b such as Corning's SMF-28™ is 0.14 dB (standard deviation=0.06). This is comparable to the traditional splice loss of 0.15 dB (standard deviation=0.029) between NZ-DSF and Corning's SMF-28™ in the 1550 nm window. It should be noted that if the MFD's at the beam waist for the two lensed optical fibers 104 and 106 are matched, then the loss should be independent of the type of fiber that is used.

Figure 4:
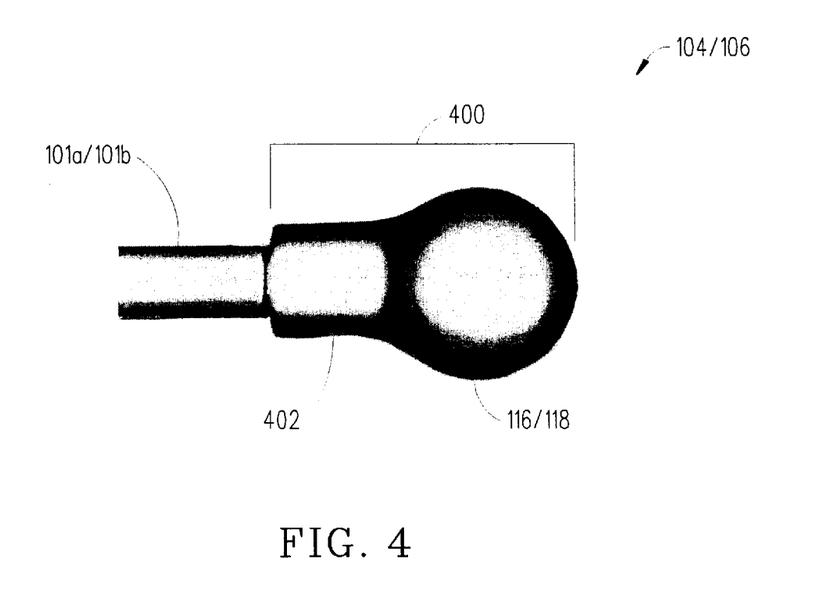
FIG. 4 is a micrograph of a lensed optical fiber that can be incorporated within the hybrid fiber expanded beam connector shown in FIG. 1.

Referring to FIG. 4, there is a micrograph of an exemplary lensed optical fiber 104 and 106 that can be used in the present invention. The glass lens 400 (lens member, plano-convex collimating lens) as shown is made from glass that is transparent at the wavelength of interest and fusion spliced to an optical fiber 101a or 101b. The glass lens 400 has a coefficient of thermal expansion (CTE) that matches or closely matches the CTE of the optical fiber 101a or 101b. Essentially, the glass lens 400 has a thickness "T" and a radius of curvature "$R_c$" (see FIG. 3). More specifically, the glass lens 400 includes a throat portion 402 and a spherical lens portion 116 and 118. The lensed optical fibers 104 and 106 can be made by splicing one end of the throat portion 402 to the optical cable 101a or 101b. Then a fusion splicer with a tungsten filament can be used to form the convex lens 116 and 118 at the other end of the throat portion 402. A more detailed discussion about the glass lens 400 is provided in Corning's U.S. patent application Ser. No. 09/812,108 the contents of which are incorporated herein by reference.

In the preferred embodiment, the lensed optical fibers 104 and 106 and in particular the spherical lens portion 116 and 118 are made of borosilicate glass. The spherical lens portion 116 and 118 that are made of borosilicate glass do not suffer from birefringence, whereas spherical lens that are made from silica are birefringent which contributes to polarization dependant losses. Moreover, the performance of the hybrid fiber expanded beam connector 100 can be enhanced when the lens 116 and 118 are made from borosilicate glass. Because, the fusion splicing of the fibers 101a and 101b to a borosilicate glass causes thermal core broadening which enlarges the mode field diameter (MFD) and increases the tolerances for lateral misalignment of the lensed optical fibers 104 and 106. In addition, the production process of the lens 116 and 118 is much more reproducible when borosilicate glass is used instead of silica.

Figure 5:
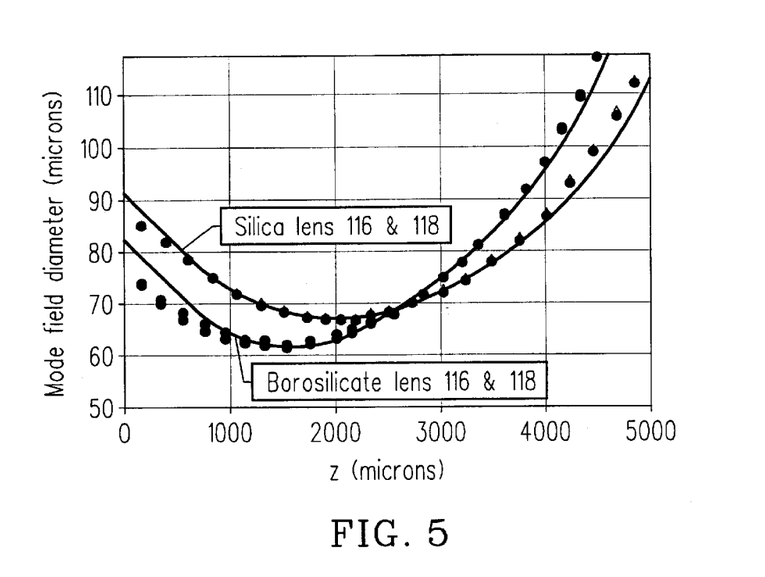
FIG. 5 is a graph showing the effect of thermal core broadening on lensed optical fibers that have silica plano convex lens and borosilicate plano convex lens.

For a more a detailed comparison between the lensed optical fibers 104 and 106 made from borosilicate glass and the lensed optical fibers 104 and 106 made from silica see FIG. 5. In particular, the effect of thermal core broadening can be seen with reference to FIG. 5. Data points represent measured MFD in x and y directions for a silica and borosilicate lens attached to Corning's SMF-28™. The solid lines represent the fit of a gaussian beam model. The data indicates that the core of the Corning's SMF-28 has broadened to about 13.6 μm from nominal fiber mode field of 10.4 μm.

The spherical lens portion 116 and 118 made from borosilicate glass or silica can also be covered with an antireflection (AR) coating (not shown) which functions to diffuse the light beam 302 to a larger spot size when the light beam 302 hits the surface of the lens 116 and 118 (see FIG. 3).

Figure 6A:
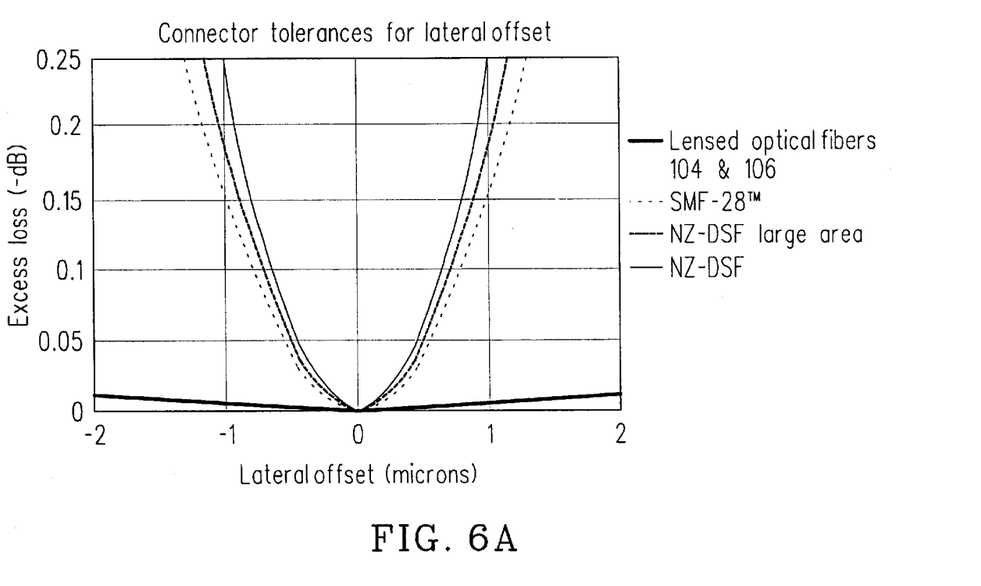
FIGS. 6A–6C are graphs showing various tolerances (e.g., lateral offset, angular offset, longitudinal displacement) associated with the hybrid fiber expanded beam connector shown in FIG. 1.
Figure 6B:
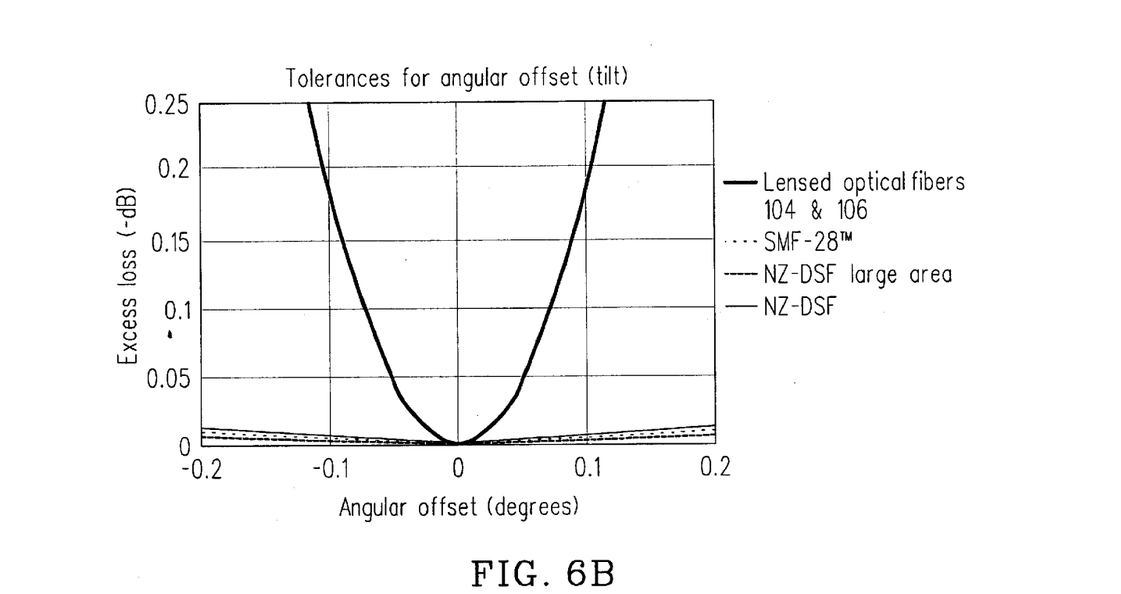
Figure 6C:
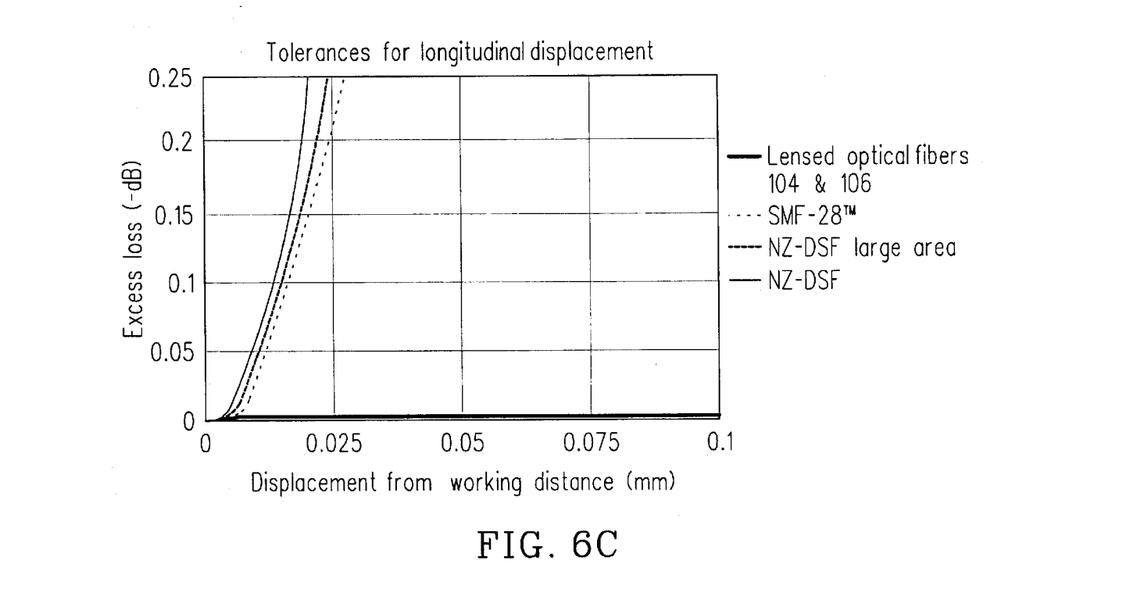

Referring to FIGS. 6A–6C, there are graphs showing various tolerances (e.g., lateral offset, angular offset, longitudinal displacement) associated with the hybrid fiber expanded beam connector 100. In particular, the graphs show the effect of lateral, angular and longitudinal misalignment on loss in the hybrid fiber expanded beam connector 100 with lensed optical fibers 104 and 106 (MFD=62 microns) and in the traditional butt-joint connectors of single mode fibers such as Corning's SMF-28™ (MFD=10.4), NZ-DSF with large area (MFD=9.6 microns) and NZ-DSF (MFD=8.4 microns). In FIGS. 6A and 6C, it can be seen that lateral and longitudinal tolerances are much better in the hybrid fiber expanded beam connector 100 (e.g., lensed optical fibers 104 and 106) compared to traditional butt-joint connectors. However, in FIG. 6B it can be seen that the tolerance to angular misalignment is much worse in the hybrid fiber expanded beam connector 100. The smaller tolerance to angular misalignment is due to the larger MFD of the hybrid fiber expanded beam connector 100. As such, the mechanical design of the hybrid fiber expanded beam connector 100 should not allow for tilting. Moreover, it is preferred to have a short working distance (e.g., lens-to-lens separation) because angular misalignment induces less lateral misalignment if the working distance is short.

Figure 7:
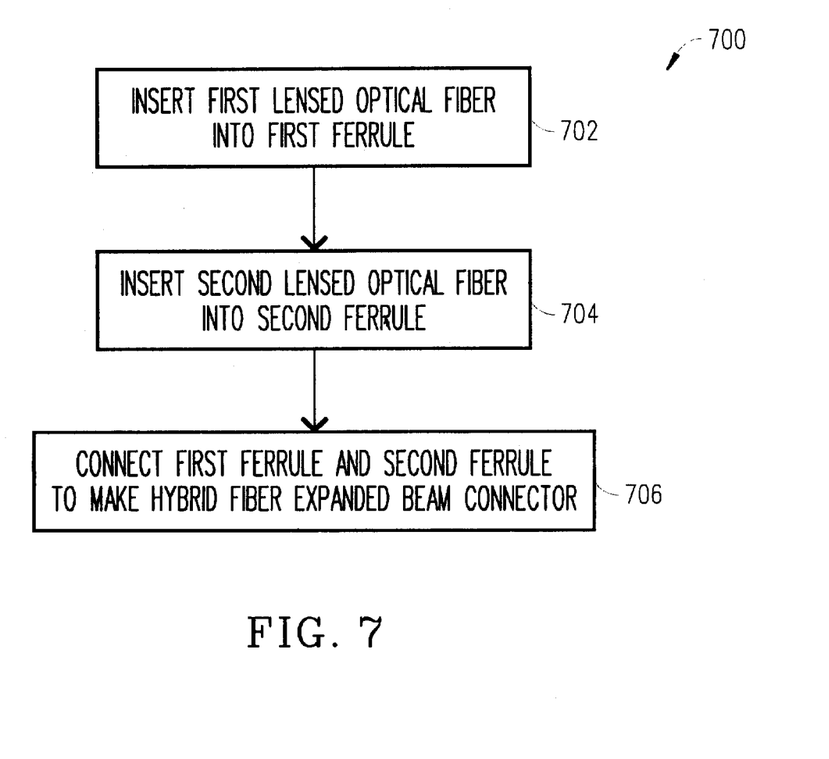
FIG. 7 is a flowchart illustrating the steps of a preferred method for making the hybrid fiber expanded beam connector shown in FIG. 1.

Referring to FIG. 7, there is a flowchart illustrating the steps of a preferred method 700 for making the hybrid fiber expanded beam connector 100. To make the hybrid fiber expanded beam connector 100, the first lensed optical fiber 104 is inserted (step 702) into the first ferrule 108. Likewise, the second lensed optical fiber 106 is inserted (step 704) into the second ferrule 110. In the preferred embodiment, the first lensed optical fiber 104 and the second lensed optical fiber 106 would be coated with an antireflection coating to reduce return loss (backreflection).

Thereafter, the first ferrule 108 is connected (step 706) to the second ferrule 110. This can be accomplished in several ways. For example, the mating alignment fixture 112 as shown in FIG. 1 along with one or more alignment pins 114 (two shown) can be used to align and hold the first ferrule 108 and the second ferrule 110. Alternatively, the first ferrule 108 and the second ferrule 110 can be connected to each other using, for example, a keyed bayonet coupling or a coupling receptacle. As a result, the first ferrule 108 and the second ferrule 110 are secured to one another in a manner such that the first lensed optical fiber 104 is aligned and separated a predetermined distance from the second lensed optical fiber 106.

After connecting the first ferrule 108 to the second ferrule 110, the hybrid fiber expanded beam connector 100 and in particular the first lensed optical fiber 104 is capable of expanding a light beam 302 traveling therein and outputting a collimated beam 302 towards the second lensed optical fiber 106. The second lensed optical fiber 106 upon receiving the collimated light beam 302 focuses the received light beam 302 such that the light beam 302 travels from the first lensed optical fiber 104 to the second lensed optical fiber 106. In a similar manner, the hybrid fiber expanded beam connector 100 can also transmit a light beam 302 from the second lensed optical fiber 106 to the first lensed optical fiber 104.

Figure 8:
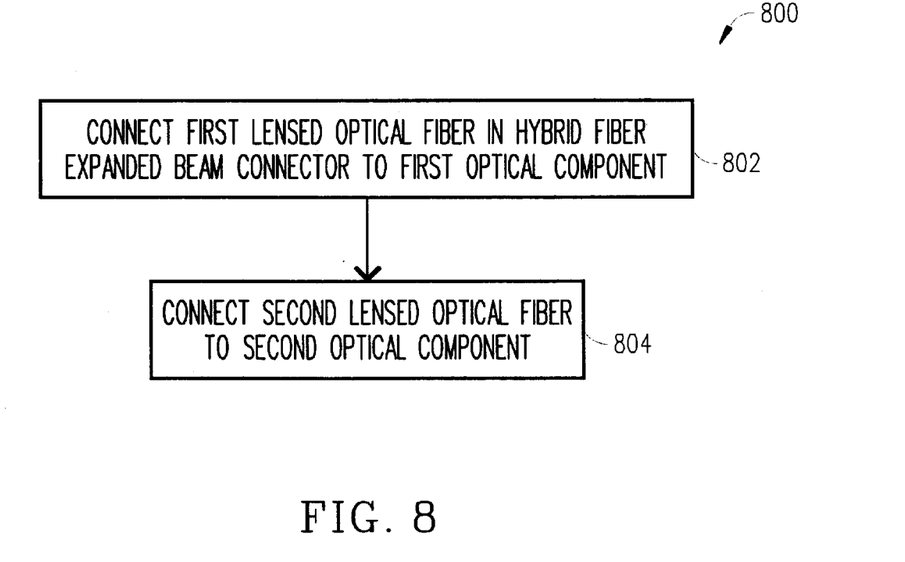
FIG. 8 is a flowchart illustrating the steps of a preferred method for using the hybrid fiber expanded beam connector shown in FIG. 1.

Referring to FIG. 8, there is a flowchart illustrating the steps of a preferred method 800 for using the hybrid fiber expanded beam connector 100. Essentially, the first lensed optical fiber 104 of the hybrid fiber expanded beam connector 100 is connected (step 802) to a first optical component (e.g., amplifier). Likewise, the second lensed optical fiber 106 of the hybrid fiber expanded beam connector 100 is connected (step 804) to a second optical component (e.g., amplifier).

Since, the hybrid fiber expanded beam connector 100 is already assembled. The first lensed optical fiber 104 is capable of expanding a light beam 302 traveling therein and outputting a collimated light beam 302 towards the second lensed optical fiber 106. The second lensed optical fiber 106 upon receiving the collimated light beam 302 focuses the received light beam 302 such that the light beam 302 travels from the first lensed optical fiber 104 to the second lensed optical fiber 106. In a similar manner, the hybrid fiber expanded beam connector 100 can transmit a light beam 302 from the second lensed optical fiber 106 to the first lensed optical fiber 104.

Described below are some examples of how one could use the hybrid fiber expanded beam connector 100:

The hybrid fiber expanded beam connector could simplify cabling, because only one type of jumper would need to be used to connect dissimilar fibers 101a and 101b. For example, prior to this invention it was common to use single mode fiber connectors in NZ-DSF routes instead of NZ-DSF assemblies to keep the loss budget lower.

The hybrid fiber expanded beam connector 100 could be used on a patchcord which could have one end as a pigtail or one end as another expanded beam connector. For example in a hybrid fiber application: one end of the hybrid fiber expanded beam connector 100 could be fusion spliced (if pigtailed) or connected (if another connector) to an amplifier (or other device operating at hybrid fiber). The output of the hybrid fiber expanded beam connector 100 could be used to route the signal back into the optical network or it could be used to take a fraction of the power from the light beam for optical performance monitoring.

The hybrid fiber expanded beam connector 100 can also be used for performing mode conversion and connecting fibers that have very different coefficients of thermal expansion, and thus cannot be spliced to each other. For example, prior to the present invention, erbium and thullium doped MCS glass would be used to gain bandwidth in fiber amplifiers. However, the MCS glass has a coefficient of thermal expansion of around 6 ppm and thus it cannot be reliably spliced to PureMode™ HI 980 fiber when an amplifier is assembled. Moreover, there is about 1 micron mode field mismatch between MCS fiber and PureMode HI 980 fiber, as well as index mismatch (n(MCS)~1.6–1.7 vs. n(PureMode™ HI 980)=1.45) that increases the backreflection loss. Using the approach in this invention, a lens could be formed at the end of erbium or thullium doped MCS glass using a rod with same glass composition as fiber core except with no erbium or thulium doping. This lens can then be AR coated to reduce return loss.

Another lens would be formed at the end PureMode™ HI 980 from silica glass. The lens geometries would be such that mode field diameters at the beam waist would match. The loss without AR coating would be ~0.5 dB and the loss with AR coating would be <0.2 dB.

Although only one embodiment of the present invention have been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A hybrid fiber expanded beam connector comprising:

a first lensed optical fiber; and a second lensed optical fiber optically coupled to said first lensed optical fiber but physically separated a predetermined distance from said first lensed optical fiber, wherein said first lensed optical fiber includes one type of fiber that was fusion spliced to a plano-convex borosilicate lens that includes a throat portion and a spherical lens portion and said second lensed optical fiber includes another type of fiber that was fusion spliced to a plano-convex borosilicate lens that includes a throat portion and a spherical lens portion whereby the fusion splicing of the fibers to the plano-convex borosilicate lenses enlarges the mode field diameters of said first and second lensed optical fibers which increases the tolerance for lateral misalignment between said first and second lensed optical fibers.

2. The hybrid fiber expanded beam connector of claim 1, wherein said one type of fiber and said another type of fiber each have different mode field diameters.

3. The hybrid fiber expanded beam connector of claim 1, wherein said one type of fiber and said another type of fiber are each made of a different glass composition.

4. The hybrid fiber expanded beam connector of claim 1, further comprising a package capable of supporting said first lensed optical fiber and said second lensed optical fiber.

5. The hybrid fiber expanded beam connector of claim 4, wherein said package further includes:

a first ferrule capable of supporting said first lensed optical fiber;

a second ferrule capable of supporting said second lensed optical fiber; and a mating alignment fixture capable of aligning and holding said first ferrule and said second ferrule such that said first lensed optical fiber is separated the predetermined distance from said second lensed optical fiber.

6. The hybrid fiber expanded beam connector of claim 1, wherein each of the throat portions and the spherical lens portions of the plano-convex borosilicate lenses have a geometry that dictates the predetermined distance said first lensed optical fiber is to be physically separated from said second lensed optical fiber.

7. A hybrid fiber expanded beam connector used to connect dissimilar fibers, said hybrid power expanded beam connector comprising:

a first lensed optical fiber including one type of fiber that was fusion spliced to a plano-convex borosilicate lens that includes a throat portion and a spherical lens portion, wherein said first lensed optical fiber is capable of expanding a light beam and outputting a collimated light beam;

a second lensed optical fiber including another type of fiber that was fusion spliced to a plano-convex borosilicate lens that includes a throat portion and a spherical lens portion, wherein said first lensed optical fiber is physically separated a predetermined distance from said second lensed optical fiber and is capable of receiving the collimated light beam and focusing the received light beam such that the light beam effectively travels from said first lensed optical fiber to said second lensed optical fiber, wherein the fusion splicing of the fibers to the plano-convex borosilicate lenses enlarges the mode field diameters of said first and second lensed optical fibers which increases the tolerance for lateral misalignment between said first and second lensed optical fibers.

8. The hybrid fiber expanded beam connector of claim 7, wherein said first lensed optical fiber includes a single-mode fiber and said second lensed optical fiber includes a non-zero dispersion-shifted fiber.

9. The hybrid fiber expanded beam connector of claim 7, wherein said first lensed optical fiber includes a single-mode fiber and said second lensed optical fiber includes a non-zero dispersion-shifted fiber that has a large effective area.

10. The hybrid fiber expanded beam connector of claim 7, wherein at least one of said first lensed optical fiber and said second lensed optical fiber includes a fiber with a complex physical profile.

11. The hybrid fiber expanded beam connector of claim 7, wherein said first lensed optical fiber and said second lensed optical fiber includes fibers that have dissimilar mode field diameters.

12. The hybrid fiber expanded beam connector of claim 7, wherein said first lensed optical fiber and said second lensed optical fiber includes fibers that have different glass compositions.

13. The hybrid fiber expanded beam connector of claim 7, further comprising a package capable of supporting and aligning said first lensed optical fiber and said second lensed optical fiber in a manner such that said first lensed optical fiber and said second lensed optical fiber face each other and are physically separated the predetermined distance.

14. The hybrid fiber expanded beam connector of claim 7, wherein each spherical lens portion is coated with an antireflection coating.

15. A method for making a hybrid fiber expanded beam connector, said method comprising the steps of:
   inserting a first lensed optical fiber into a first ferrule, wherein said first lensed optical fiber includes one type of fiber that was fusion spliced to a plano-convex borosilicate lens that includes a throat portion and a spherical lens portion;
   inserting a second lensed optical fiber into a second ferrule, wherein said second lensed optical fiber includes another type of fiber that was fusion spliced to a plano-convex borosilicate lens that includes a throat portion and a spherical lens portion;
   securing said first ferrule and said second ferrule such that said first lensed optical fiber and said second lensed optical fiber are aligned and separated a predetermined distance from one another thus enabling said first lensed optical fiber to expand a light beam traveling therein and then to output a collimated light beam towards said second lensed optical fiber which receives the collimated light beam and focuses the received light beam such that the light beam effectively travels from said first lensed optical fiber to said second lensed optical fiber, wherein the fusion splicing of the fibers to the plano-convex borosilicate lenses enlarges the mode field diameters of said first and second lensed optical fibers which increases the tolerance for lateral misalignment between said first and second lensed optical fibers.

16. The method of claim 15, wherein said one type of fiber and said another type of fiber each have different mode field diameters.

17. The method of claim 15, wherein said one type of fiber and said another type of fiber are each made of a different glass composition.

18. The method of claim 15, wherein each spherical lens portion is coated with an antireflection coating.

19. A method for using a hybrid fiber expanded beam connector, said method comprising the steps of:
   connecting a first lensed optical fiber to a first optical component, wherein said first lensed optical fiber includes one type of fiber that was fusion spliced to a plano-convex borosilicate lens that includes a throat portion and a spherical lens portion; and
   connecting a second lensed optical fiber to a second optical component, wherein said second lensed optical fiber includes another type of fiber that was fusion spliced to a plano-convex borosilicate lens that includes a throat portion and a spherical lens portion, wherein said first lensed optical fiber and said second lensed optical fiber are aligned and separated a predetermined distance from one another thus enabling said first microlensed to expand a light beam traveling therein and to output a collimated light beam towards said second lensed optical fiber which receives the collimated light beam and focuses the received light beam such that the light beam effectively travels from said first optical component to said second optical component, whereby the fusion splicing of the fibers to the plano-convex borosilicate lenses enlarges the mode field diameters of said first and second lensed optical fibers which increases the tolerance for lateral misalignment between said first and second lensed optical fibers.

20. The method of claim 19, wherein said one type of fiber and said another type of fiber each have different mode field diameters.

21. The method of claim 19, wherein said one type of fiber and said another type of fiber are each made of a different glass composition.

22. The method of claim 19, wherein each spherical lens portion is coated with an antireflection coating.

23. The hybrid fiber expanded beam connector of claim 1, wherein said hybrid fiber expanded beam connector has a coupling efficiency less than or equal to about 0.14 dB.

24. The hybrid fiber expanded beam connector of claim 1, wherein said first lensed optical fiber is capable of outputting a collimated light beam and said second lensed optical fiber is capable of receiving the collimated light beam because each of the spherical lens portions have a geometry and index of refraction in accordance with the following equation:

$$T = R_c * (n/n - 1) + \Phi$$

where
   T=thickness of the respective spherical lens portion
   $R_c$=radius curvature of the respective spherical lens portion
   n=index of refraction of the respective spherical lens portion
   $\Phi$=phase shift and wherein said thickness of each spherical lens portion is then increased by a diffractive focal shift to take into account the particular geometries of said first and second lensed optical fibers.

25. The hybrid fiber expanded beam connector of claim 7, wherein said first lensed optical fiber is capable of outputting the collimated light beam and said second lensed optical fiber is capable of receiving the collimated light beam because each of the spherical lens portions have a geometry and index of refraction in accordance with the following equation:

$$T=R_c*(n/n-1)+\Phi$$

where

T=thickness of the respective spherical lens portion $R_c$=radius curvature of the respective spherical lens portion n=index of refraction of the respective spherical lens portion Φ=phase shift and wherein said thickness of each spherical lens portion is then increased by a diffractive focal shift to take into account the particular geometries of said first and second lensed optical fibers.

26. The method of claim 15, wherein said first lensed optical fiber is capable of outputting the collimated light beam and said second lensed optical fiber is capable of receiving the collimated light beam because each of the spherical lens portions have a geometry and index of refraction in accordance with the following equation:

$$T=R_c*(n/n-1)+\Phi$$

where

T=thickness of the respective spherical lens portion $R_c$=radius curvature of the respective spherical lens portion n=index of refraction of the respective spherical lens portion Φ=phase shift and wherein said thickness of each spherical lens portion is then increased by a diffractive focal shift to take into account the particular geometries of said first and second lensed optical fibers.

27. The method of claim 19, wherein said first lensed optical fiber is capable of outputting the collimated light beam and said second lensed optical fiber is capable of receiving the collimated light beam because each of the spherical lens portions have a geometry and index of refraction in accordance with the following equation:

$$T=R_c*(n/n-1)+\Phi$$

where

T=thickness of the respective spherical lens portion $R_c$=radius curvature of the respective spherical lens portion n=index of refraction of the respective spherical lens portion Φ=phase shift and wherein said thickness of each spherical lens portion is then increased by a diffractive focal shift to take into account the particular geometries of said first and second lensed optical fibers.

* * * * *